(12) United States Patent
Murphy

(10) Patent No.: US 6,691,517 B1
(45) Date of Patent: *Feb. 17, 2004

(54) COMPOUND ROTARY INTERNAL COMBUSTION ENGINE

(76) Inventor: Richard V. Murphy, 2420 E. 84th Ave., Denver, CO (US) 80229

(*) Notice: Subject to any disclaimer, the term of this patent is extended or adjusted under 35 U.S.C. 154(b) by 0 days.

This patent is subject to a terminal disclaimer.

(21) Appl. No.: 10/123,537

(22) Filed: Apr. 15, 2002

Related U.S. Application Data

(63) Continuation of application No. 09/659,905, filed on Sep. 18, 2000, now Pat. No. 6,370,864.

(51) Int. Cl.7 .................................................. F02C 5/02
(52) U.S. Cl. ........................ 60/772; 60/39.15; 60/39.38; 60/39.4; 60/39.41
(58) Field of Search ................................ 60/772, 39.15, 60/39.76, 39.81, 39.39, 39.4, 39.41, 805

(56) References Cited

U.S. PATENT DOCUMENTS

| | | | | |
|---|---|---|---|---|
| 861,329 A | * | 7/1907 | Stodola | 60/805 |
| 972,642 A | * | 10/1910 | Reed | 60/805 |
| 1,031,718 A | * | 7/1912 | Kasley | 60/39.39 |
| 1,346,509 A | * | 7/1920 | Olhovsky | 60/805 |
| 1,874,314 A | * | 9/1932 | Lasley | 60/39.5 |
| 2,078,958 A | * | 5/1937 | Lysholm | 60/39.15 |
| 2,493,873 A | * | 1/1950 | Hill | 60/805 |
| 2,908,135 A | * | 10/1959 | King, Jr. et al. | 60/804 |
| 3,488,952 A | * | 1/1970 | Brille | 60/39.76 |
| 3,613,361 A | * | 10/1971 | Rifkin | 60/39.41 |
| 3,692,421 A | * | 9/1972 | Dworski | 60/805 |
| 5,960,625 A | * | 10/1999 | Zdvorak, Sr. | 60/39.34 |
| 6,370,864 B1 | * | 4/2002 | Murphy | 60/39.15 |

* cited by examiner

*Primary Examiner*—Ted Kim
(74) *Attorney, Agent, or Firm*—Ramon L. Pizarro; Edwin H. Crabtree

(57) ABSTRACT

A turbine based engine that includes a mixture chamber, a combustion chamber, a stationary flow control barrier, and a turbine. The stationary flow control barrier is located between the combustion chamber and the turbine. The arrangement allows the system to provide precisely measured and mixed fuel and oxidant mixtures to the mixture chamber where it is burned to produce the expandable gas product that will be expanded through the turbine to turn the turbine and produce shaft output power. A preferred embodiment of the engine includes a pair of turbines mounted symmetrically about an expeller along a single shaft.

16 Claims, 3 Drawing Sheets

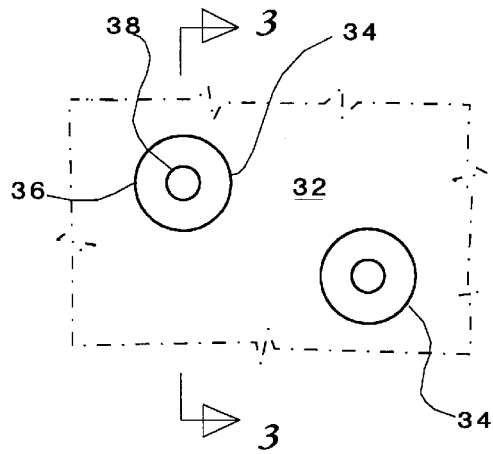
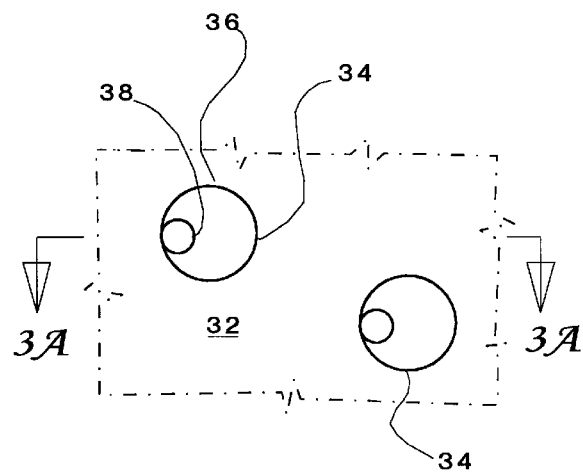
Fig. 2        Fig. 2A
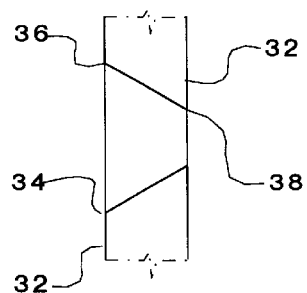
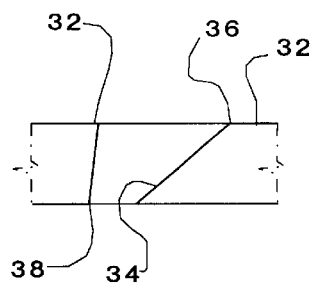
Fig. 3        Fig. 3A

COMPOUND ROTARY INTERNAL COMBUSTION ENGINE

REFERENCE TO RELATED APPLICATIONS

This application is a continuation of my application having Ser. No. 09/659,905, filed Sep. 18, 2000, now U.S. Pat. No. 6,370,884 incorporated herein in its entirety by reference.

BACKGROUND OF THE INVENTION (a) Field of the Invention

This invention generally relates to an internal combustion engine that uses rotors or turbines to convert energy released from combustion to shaft power or mechanical output. More particularly, but not by way of limitation, to a rotary motor that includes at least one combustion chamber that delivers the products of combustion in a controlled manner to a turbine or rotor.

(b) Discussion of Known Art

The advantages of a rotary type motor have long been recognized. However, the development of a motor that is able to reliably deliver power harnessed from combustion has seen few successful solutions. The need or absence of such an engine has been particularly acute in the area of smaller turbines where the flow of gasses through the turbine must be carefully controlled in order to prevent damage to the surrounding areas from the exhaust.

The use of a separate combustion chamber, which allows the generation of a working fluid is found in the field of steam turbines, where the steam that is used as the working fluid that moves the turbine is generated in a separate boiler that feeds steam to the turbine. This type of system takes advantage of the ease with which steam pressure can be controlled to deliver a desired flow rate of steam to the turbine. Thus, the steam turbine model provides a good model for applications where a working fluid such as steam can be released at a controlled rate. However, this model has proven to be inappropriate for applications where the turbine is to be rotated by the products of combustion of a fuel and oxidant mixture, for example.

Many known turbine applications that use products of combustion in order to turn the blades of a turbine use a series of turbines that harvest the power released from the rapid expansion from combustion to harvest the needed power to compress the fuel and oxidant mixture and provide power to carry out useful work. Thus, these systems employ a set of axially positioned turbine components that depend on high speed rotation of the components, and very high flow rates of the gases used to power the turbines, in order to provide sustained combustion and rotation of the compressor and power generation components.

Furthermore, it is well recognized that turbines offer significant advantages over reciprocating engines, particularly in applications where high revolutions per minute (RPMs) are required. However, it has not been practicable to provide a small turbine that can be used in, for example, automotive applications. A significant drawback to the use of turbines in these applications is the high flow rate of gasses generated and discharged during the operation of the turbine. The temperature and flow rate of the exhaust gases delivered from such a turbine create the possibility of causing serious injury to people and property in the vicinity of the exhaust from the vehicle.

Thus, there remains a need for a turbine based engine that can be driven by gases produced from internal combustion, and that permits a highly controlled flow of these gases through the turbine.

There remains a need for a turbine base engine that uses at least one turbine to harvest the power released upon combustion, and which allows control of the combustion and delivery of the products of combustion to the turbine.

SUMMARY

It has been discovered that the problems left unanswered by known art are solve by providing a turbine based engine that includes:
- a mixture chamber;
- a combustion chamber;
- a stationary flow control barrier; and
- a turbine. The stationary flow control barrier is located between the combustion chamber and the turbine. It has been discovered that this arrangement allows the system to provide precisely measured and mixed fuel and oxidant mixtures to the mixture chamber where it is burned to produce the expandable gas product that will be expanded through the turbine to turn the turbine.

According to a highly preferred embodiment of the invention the stationary flow control barrier consists of a gas flow control plate that includes ducts that permit gases to flow from the combustion chamber towards the turbine. In a highly preferred embodiment of the invention, these ducts have a tapered or nozzle shaped contour, starting as an aperture of a first dimension near the combustion chamber and progressing to a second, smaller dimension near the turbine. This reduction in the size of the ducts will have the effect of accelerating the flow of the products of combustion as it progresses towards the turbine.

It is further contemplated that the fuel and oxidant mixture will be delivered to the combustion chamber by way of valves that control the flow of mixture gases into the combustion chamber. It is contemplated that these valves may control the flow of a fuel and oxidant mixture or the flow of at least one of the components for the mixture and the remaining components for the mixture provided by of an injector or other delivery device.

According to a highly preferred example of the invention, a generally symmetrical arrangement is provided. In this arrangement an expeller device is position along a place of symmetry for the system. Thus, a turbine is positioned on each side of the expeller. The turbines will allow expansion towards the expeller, and thus allow mounting of the expeller and turbines along a single shaft between a pair of mixture chambers, combustion chambers, and flow control barriers.

It is further contemplated that these examples may include gas flow control systems that are indexed from the shaft that supports the turbines. It is contemplated that these systems may include cams, markers or other triggering mechanisms that may be used to control a signal that is used to control the delivery of the gasses needed for combustion.

Thus, it should also be understood that while the above and other advantages and results of the present invention will become apparent to those skilled in the art from the following detailed description and accompanying drawings, showing the contemplated novel construction, combinations and elements as herein described, and more particularly defined by the appended claims, it should be clearly understood that changes in the precise embodiments of the herein disclosed invention are meant to be included within the scope of the claims, except insofar as they may be precluded by the prior art.

DRAWINGS

The accompanying drawings illustrate preferred embodiments of the present invention according to the best mode presently devised for making and using the instant invention, and in which:

FIG. 2 is a section taken at the location indicated on FIG. 1, and illustrates an arrangement of the apertures on a plate that serves as a flow control barrier.

FIG. 2A is a section similar to FIG. 2 and illustrating the use of angled or pointed apertures that function as nozzles directing the flow over the turbine blades.

FIG. 3 is a section taken from FIG. 2 and illustrates the taper of the apertures to produce an acceleration of the flow.

FIG. 3A is a section taken from FIG. 2 and illustrates the taper of the apertures to produce an acceleration of the flow.

DETAILED DESCRIPTION OF PREFERRED EXEMPLAR EMBODIMENTS

While the invention will be described and disclosed here in connection with certain preferred embodiments, the description is not intended to limit the invention to the specific embodiments shown and described here, but rather the invention is intended to cover all alternative embodiments and modifications that fall within the spirit and scope of the invention as defined by the claims included herein as well as any equivalents of the disclosed and claimed invention.

Figure 1:
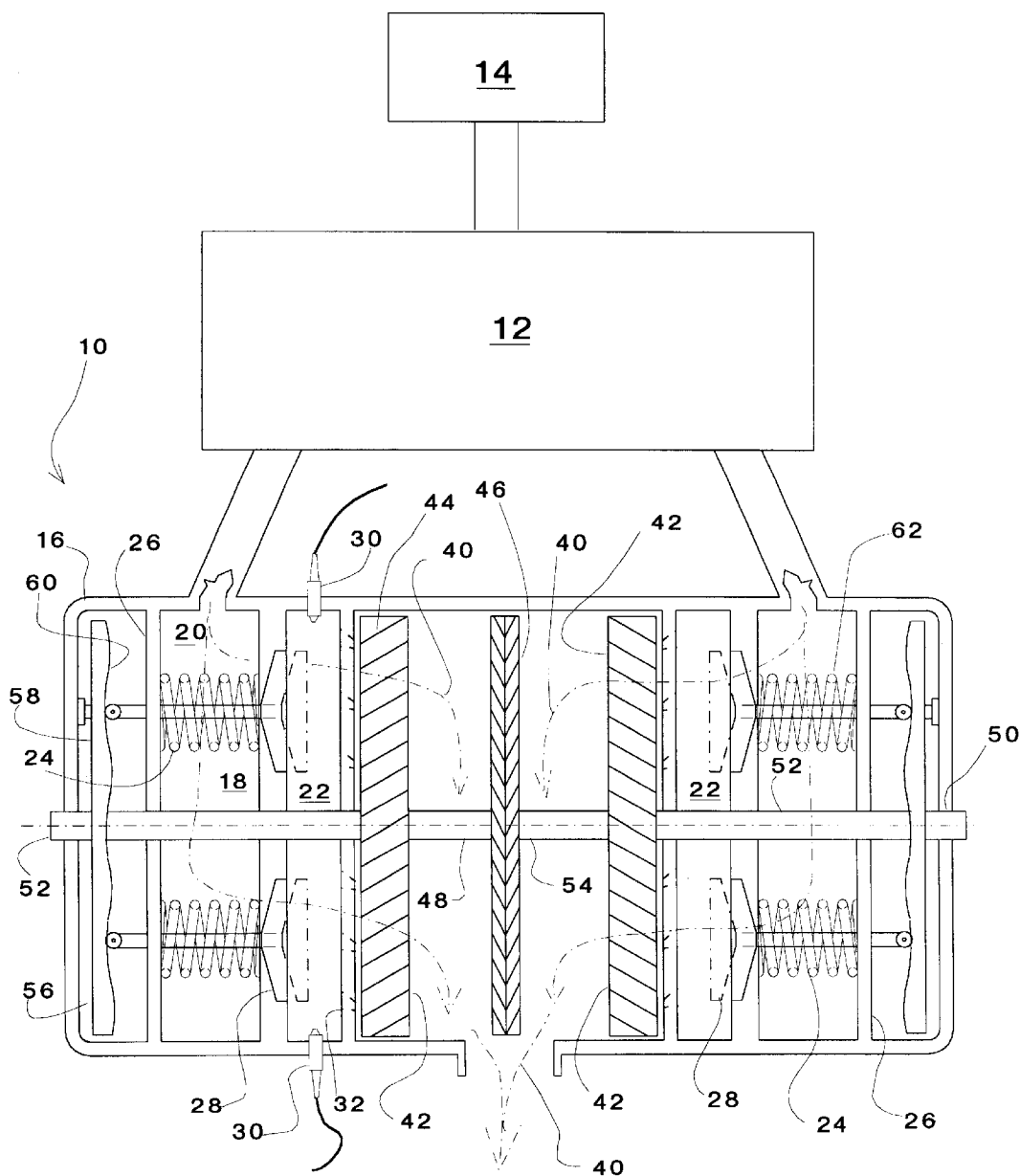
FIG. 1 is a cross-sectional view of an embodiment of the invention, the view illustrating the use of a symmetrical turbine arrangement.

Turning now to FIG. 1 where a turbine-based engine 10 made in accordance with the principles taught herein has been illustrated. The turbine-based engine 10 has been designed to operate on a flow of gases produced by combustion of a fuel with an oxidant. The fuel may be a petroleum based fuel, or another combustible or oxidizeable substance, such as alcohol, hydrogen, hydrocarbons or oils. As discussed above, the disclosed invention is particularly useful in the use of gases released or produced during combustion because of the ability of control the explosive expansion or flow of these gases with the structure of the disclosed invention.

As shown on FIG. 1, the engine 10 disclosed herein accepts a fuel and oxidant mixture form a source such a compressed air tank 12, which is replenished by a compressor 14 or similar device that is used to provide a suitable fuel and air, or other oxidant, mixture to the engine 10. The engine 10 includes a housing 16 that supports the key components of the engine 10. In the illustrated example, the engine 10 includes a mixture chamber 18 that accepts the fuel and oxidant mixture 20 delivered from the tank 12. It is important to note, that it is contemplated that the mixture chamber 18 may alternatively be used to distribute only the oxidant, such as air, and a separate duct and injector would then be incorporated into the system to produce the needed mixture in the mixture chamber 18 or in a combustion chamber 22 that lies downstream of the mixture chamber 18.

As shown on FIG. 1, the fuel and oxidant mixture 20 is delivered to the combustion chamber 18 from the mixture chamber 18 by way of a valve mechanism 24 that is mounted on a backing plate 26, which is in-turn supported by the housing 16. In a preferred example, the valve mechanism 24 opens and closes a set of valves 28 that allow the fuel and oxidant mixture 20 to flow from the mixture chamber 18 on to the combustion chamber 22, where it is ignited with the use of a spark plug 30, or other ignition device.

Thus, the fuel and oxidant mixture 20 enters the combustion chamber 18, which is defined by the backing plate 26 on one end, and a stationary flow control barrier 32 on the other end. The sidewalls of this example are defined by the housing 16.

Turning now to FIGS. 2 and 2A, it will be understood that the stationary flow control barrier 32 will preferably include a plurality of apertures 34. As shown in FIG. 2A, the apertures 34 will include an entrance 36 of a desired cross-sectional area and an exit 38, preferably having a cross-sectional area that is smaller than the cross-sectional area of the entrance 36. Thus the dimension of the entrance 36 aperture is of a first dimension near the combustion chamber and the size of the aperture is reduced as one progresses towards the exit 38, which is of a second, smaller dimension than the entrance 36.

To carry out useful work, the disclosed system relies on the expansion of the products of combustion. To ignite the fuel and oxidant mixture 20, the valves 28 are closed and the fuel and oxidant mixture 20 ignited with the use of the spark plug 30. The products of combustion 40 are generated by ignition of the fuel and oxidant mixture 20 in the combustion chamber 22. Since the valves 28 are closed during this expansion, the expanding gases or products of combustion 40 flow through the apertures 34, where they are accelerated due to the existence of a constriction in the flow path through the aperture 34 in the stationary flow control barrier 32.

As shown on FIG. 1, a turbine 42 is positioned immediately downstream from the stationary flow control barrier 32. Thus, the gases flowing through the apertures 34 will immediately encounter the blades 44 of the turbine 42 as these gases move through the stationary flow control barrier 32. The gases, or products of combustion 40, will cause the blades 44 of the turbine 42 to rotate by interacting with the blades of the turbine in a known manner. In other words, the rotation will be induced by the flow of the gas, the products of combustion 40, on the blades 44 of the turbine 40. This includes a lift effect caused by the profile of the blades.

As the products of combustion 40 flow past the turbine 42 the gases then encounter an expeller 46, which simply assists in driving the expanded gasses from the engine 10. It is important to note that it is contemplated that in an embodiment that includes a single turbine 42, shown on FIG. 5, the expeller 46 may be omitted. However, in a highly preferred example of the invention, where a pair of turbines in series that accept flow in opposite directions, incorporation of the expeller 46 is highly desirable.

Figure 4:
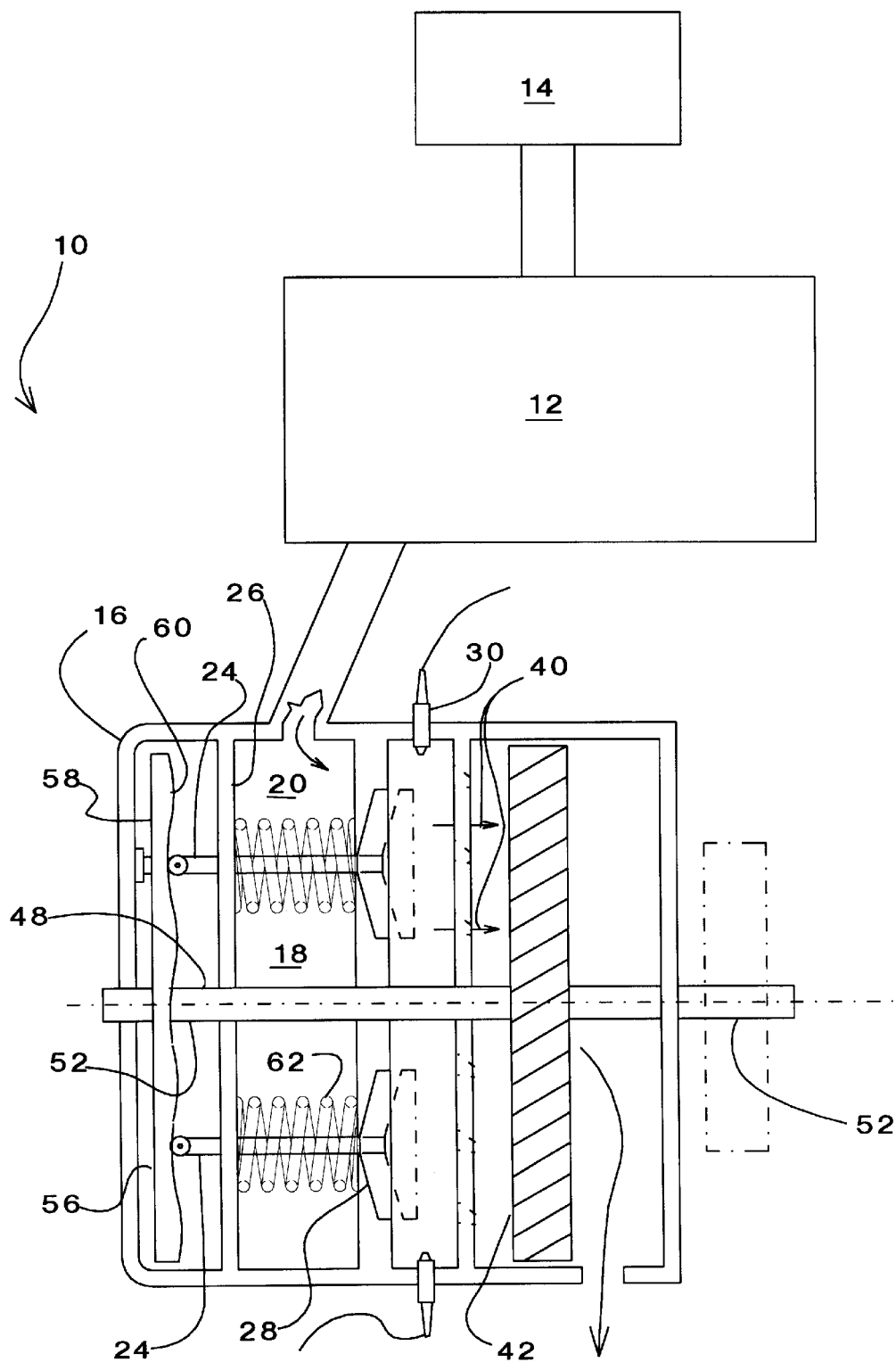
FIG. 4 illustrates the use of a single turbine to carry out the principles taught herein.

Referring now to FIGS. 1 and 4, it will be understood that the preferred embodiment of the invention, which uses a pair of turbines 42, both mounted on a single shaft 48 that is supported by the housing 16 by way of bushings or bearings 50. As illustrated, the shaft 48 includes a pair of opposite ends 52 and a mid-section 54. Thus, the expeller 46 lies along a plane of symmetry for the main components of the dual turbine engine 10. An important advantage of using a pair of turbines 42 on a shaft is that the shaft 48 may be used to drive a timing mechanism 56 that cooperates with the valve mechanism 24 to open and close the valves 28 at the desired moments for introducing the fuel and oxidant mixture 20 into the combustion chamber 22.

It is contemplated that the timing mechanism 56 may include mechanically actuated systems. For example, it is contemplated that a plate 58 with a cam surface 60 may be employed to open and close the valves 28, which may be held in a normally closed position by valve springs 62. Thus, each end 52 of the shaft 48 may support a plate 58, which controls the timing of the delivery of the fuel and oxidant mixture 20 for each of the combustion chambers 22 on each side of the expeller 46. With this arrangement the ignition, which may also be controlled by an indexing mechanism such as the plate 58 and cam surface 60. The timing of the ignition of the fuel and oxidant mixture 20 would be arranged such that the mixture in the combustion chamber 22 on one side of the expeller 46 would be ignited while the fuel and oxidant mixture 20 is being introduced into the combustion chamber 22 on the opposite side of the expeller 46.

Thus it can be appreciated that the above-described embodiments are illustrative of just a few of the numerous variations of arrangements of the disclosed elements used to carry out the disclosed invention. Moreover, while the invention has been particularly shown, described and illustrated in detail with reference to preferred embodiments and modifications thereof, it should be understood that the foregoing and other modifications are exemplary only, and that equivalent changes in form and detail may be made without departing from the true spirit and scope of the invention as claimed, except as precluded by the prior art.

What is claimed is:

1. A turbine based engine operating on a flow of gases produced by combustion, the engine comprising:
    a mixture chamber;
    a combustion chamber that is in fluid communication with said mixture chamber;
    said combustion chamber being bounded by a generally planar stationary control barrier having a plurality of permanently open apertures therethrough; and
    a turbine, said stationary flow control barrier being the direct separation between said turbine and said combustion chamber, so that said permanently open apertures provide restricted fluid communication between said combustion chamber and said turbine, so that a flow of gases produced by combustion flows at a rate controlled by said stationary flow control barrier from said combustion chamber through said stationary control barrier and through said turbine to produce rotation of said turbine to create an output of shaft power.

2. An engine according to claim 1 and further comprising a valve mechanism for controlling flow from said mixture chamber to said combustion chamber.

3. An engine according to claim 1 wherein said restricted flow through said stationary flow control barrier comprises a plurality of apertures, each of said aperture being of a first size near said combustion chamber and being of a second size near said turbine, the second size being smaller than the first size, so that a gas moving through each of said apertures is accelerated as it moves through the aperture towards the turbine.

4. An engine according to claim 1 and further comprising an exhaust expeller, said exhaust expeller being positioned next to said turbine and positioned such that said turbine is between the expeller and said combustion chamber.

5. An engine according to claim 4 wherein said expeller and said turbine are each mounted on a shaft, and said expeller and said turbine are both mounted on the same shaft.

6. A turbine based engine operating on a flow of gases produced by combustion, the engine comprising:
    a housing, the housing supporting a shaft, the shaft having a pair of opposite ends and a mid-section;
    a pair of mixture chambers, each mixture chamber being near one of the ends of the shaft;
    a pair of combustion chambers, each combustion chamber being bounded by a stationary control barrier that is generally planar and includes a plurality of permanently open apertures therethrough, the permanently open apertures providing fluid communication with a respective one of said mixture chambers;
    a pair of turbines; and
    an expeller, said expeller being mounted on the mid-portion of said shaft and generally symmetrically separating said pair of turbines, said pair of stationary flow control barriers, and said pair of combustion chambers, each of said stationary flow control barriers being between one of said turbines and one of said combustion chambers, to provide restricted fluid communication between each of said combustion chamber and each of said turbines, so that flow of gases produced by combustion flows towards each of said turbines at a rate controlled by one said stationary flow control barriers while flowing from said combustion chamber through said stationary control barrier and through said turbine to produce rotation of said turbine to create an output of shaft power.

7. An engine according to claim 6 and further comprising a valve mechanism for controlling flow from said mixture chamber to said combustion chamber.

8. An engine according to claim 6 wherein said restricted flow through said stationary flow control barrier comprises a plurality of apertures, each of said aperture being of a first size near said combustion chamber and being of a second size near said turbine, the second size being smaller than the first size, so that a gas moving through each of said apertures is accelerated as it moves through the aperture towards the turbine.

9. An engine according to claim 6 wherein said expeller is positioned next to said turbine and positioned such that said turbine is between the expeller and said combustion chamber.

10. An engine according to claim 6 wherein the fluid communication between said combustion chamber and said mixture chamber is controlled by a valve mechanism.

11. An engine according to claim 10 wherein said valve mechanism is indexed and controlled by a cam surface operated from the shaft.

12. A method for producing torsional power output from a turbine based engine operating on a flow of gases produced by combustion, the method comprising:
    providing an engine having:
        a mixture chamber;
        a combustion chamber that is in fluid communication with said mixture chamber;
        a stationary control barrier having a plurality of permanently open apertures therethrough; and
        a turbine, said stationary flow control barrier being between said turbine and said combustion chamber so that said permanently open apertures provide restricted fluid communication between said combustion chamber and said turbine;
    directly separating the turbine from the combustion chamber with the stationary control barrier;
    delivering a fuel and oxidant mixture though the mixture chamber into the combustion chamber;
    combusting the fuel and oxidant mixture in the combustion chamber, against the stationary control barrier to produce a flow of gases from the combustion; and delivering the flow of gases from the combustion at a rate controlled by the stationary flow control barrier from said combustion chamber through said stationary control barrier and through said turbine to produce rotation of said turbine to create an output of shaft power.

13. A method according to claim 12 and further comprising providing a valve mechanism for controlling flow from said mixture chamber to combustion chamber and selectively delivering the fuel and oxidant mixture to the combustion chamber through the valve mechanism.

14. A method according to claim 12 wherein said restricted flow through said stationary flow control barrier comprises a plurality of apertures, each of said aperture being of a first size near said combustion chamber and being of a second size near said turbine, the second size being smaller than the first size, so that a gas moving through each of said apertures is accelerated as it moves through the aperture towards the turbine.

15. A method according to claim 12 and further comprising an exhaust expeller, said exhaust expeller being positioned next to said turbine and positioned such that said turbine is between the expeller and said combustion chamber.

16. A method according to claim 15 wherein said expeller and said turbine are each mounted on a shaft, and said expeller and said turbine are both mounted on the same shaft.

* * * * *